United States Patent
Ryu et al.

(10) Patent No.: US 12,463,776 B2
(45) Date of Patent: Nov. 4, 2025

(54) APERIODIC ZERO POWER CHANNEL STATE INFORMATION REFERENCE SIGNAL ENHANCEMENT FOR MULTI-SLOT PDSCH RATE MATCHING

(71) Applicant: QUALCOMM Incorporated, San Diego, CA (US)

(72) Inventors: Jae Ho Ryu, San Diego, CA (US); Kazuki Takeda, Minato-ku (JP); Hobin Kim, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 17/936,797

(22) Filed: Sep. 29, 2022

(65) Prior Publication Data
US 2024/0113831 A1   Apr. 4, 2024

(51) Int. Cl.
*H04L 5/00* (2006.01)
*H04L 1/00* (2006.01)
*H04W 72/23* (2023.01)

(52) U.S. Cl.
CPC .......... *H04L 5/0051* (2013.01); *H04L 1/0067* (2013.01); *H04W 72/23* (2023.01)

(58) Field of Classification Search
CPC ..... H04L 5/00; H04L 5/14; H04L 1/00; H04L 1/18; H04L 1/08; H04L 27/26; H04W 72/04; H04W 72/21; H04W 72/23; H04W 24/10; H04W 52/14; H04W 52/02; H04W 52/34; H04W 52/32; H04W 52/36; H04W 52/58; H04W 74/08

USPC .......................................................... 370/329
See application file for complete search history.

(56) References Cited

U.S. PATENT DOCUMENTS

| | | | | |
|---|---|---|---|---|
| 9,307,521 B2* | 4/2016 | Ng | .......... | H04L 5/0053 |
| 10,111,124 B2* | 10/2018 | Gong | .......... | H04L 5/0071 |
| 10,862,560 B2* | 12/2020 | Nam | .......... | H04B 7/0626 |
| 11,063,692 B2* | 7/2021 | Hosseini | .......... | H04L 1/0013 |
| 11,711,817 B2* | 7/2023 | Hosseini | .......... | H04L 5/0053 |
| | | | | 370/329 |
| 11,831,445 B2* | 11/2023 | Yang | .......... | H04L 1/1896 |

(Continued)

OTHER PUBLICATIONS

International Search Report and Written Opinion—PCT/US2023/071304—ISA/EPO—Nov. 8, 2023.

*Primary Examiner* — Man U Phan
(74) *Attorney, Agent, or Firm* — Arent Fox, LLP

(57) ABSTRACT

Aspects of the present disclosure allow for more efficient rate matching by allowing a triggered A-ZP-CSI-RS set to support rate matching around multiple slots. Aspects of the present disclosure may allow a triggered A-ZP CSI-RS set to be applied to less than all scheduled PDSCH slots when DCI schedules PDSCH on multiple slots. Aspects of the present disclosure may extend CSI-RS resource mapping to span multiple adjacent slots. In another instance, aspects of the present disclosure allow a resource mapping configuration to indicate an initial symbol of a plurality of symbols spanning the plurality of slots for a respective A-ZP-CSI-RS resource. Doing so also allows a PDSCH transmission in a slot among the plurality of slots using a rate matching pattern associated with a set of A-ZP-CSI-RE resources to be received. In addition, aspects of the present disclosure can also add periodicity to A-ZP-CSI-RS resource set configuration.

26 Claims, 11 Drawing Sheets

(56) References Cited

U.S. PATENT DOCUMENTS

| | | | |
|---|---|---|---|
| 11,924,867 B2* | 3/2024 | Tidestav | H04L 5/0051 |
| 11,943,165 B2* | 3/2024 | Yum | H04L 5/0053 |
| 12,003,335 B2* | 6/2024 | Yang | H04L 1/1812 |
| 12,156,204 B2* | 11/2024 | Muruganathan | H04L 5/0094 |
| 2020/0052813 A1 | 2/2020 | Hosseini et al. | |
| 2021/0321444 A1 | 10/2021 | Hosseini et al. | |
| 2022/0304039 A1* | 9/2022 | Jiang | H04W 72/23 |
| 2023/0116653 A1* | 4/2023 | Abdelghaffar | H04W 72/0446 370/329 |
| 2024/0039658 A1* | 2/2024 | Raao | H04L 5/005 |

* cited by examiner

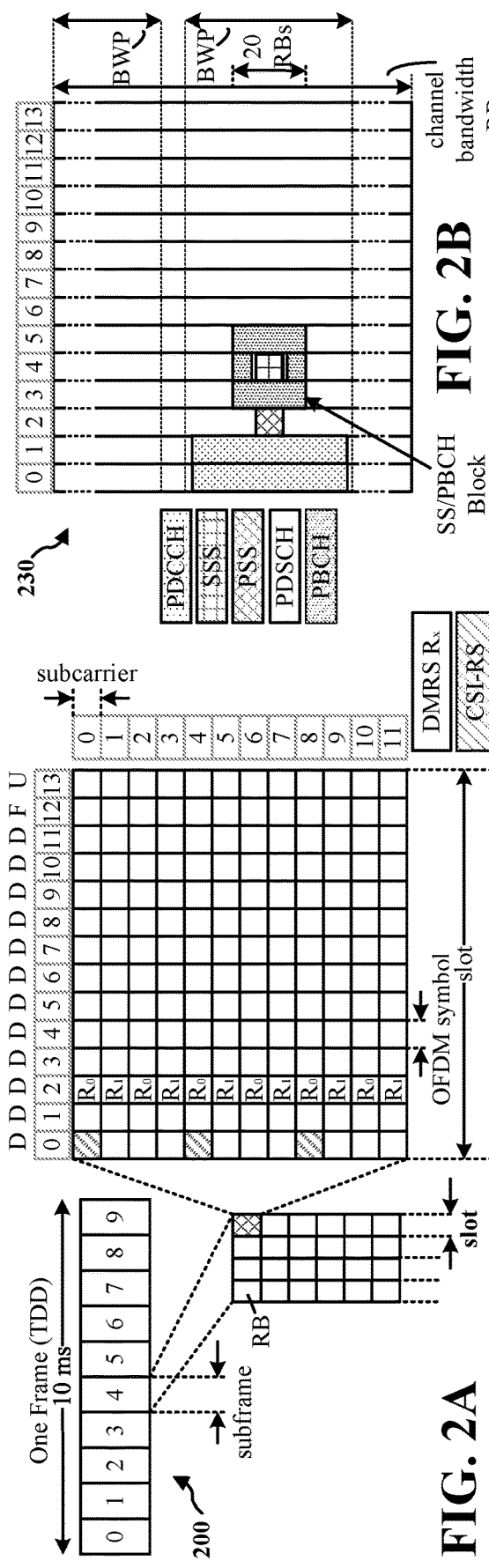
FIG. 2A
FIG. 2B
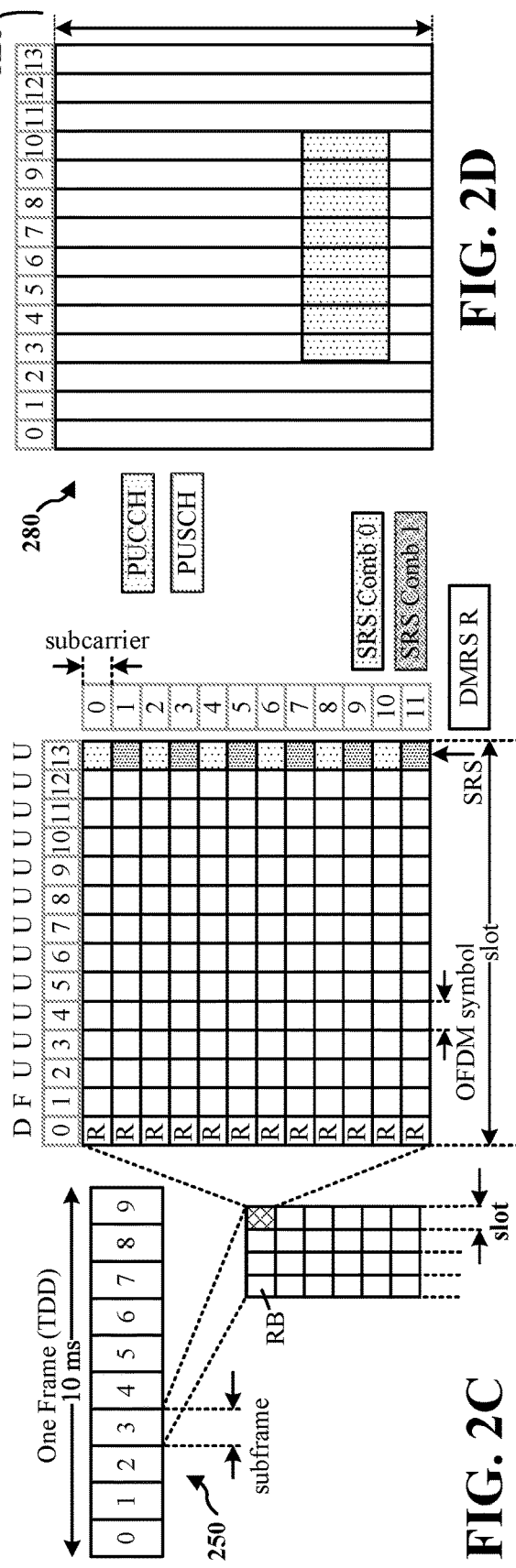
FIG. 2C
FIG. 2D

APERIODIC ZERO POWER CHANNEL STATE INFORMATION REFERENCE SIGNAL ENHANCEMENT FOR MULTI-SLOT PDSCH RATE MATCHING

TECHNICAL FIELD

The present disclosure generally relates to communication systems, and more particularly, to wireless communication system between a network device and a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the subject matter described in this disclosure can be implemented in an apparatus for wireless communication at a user equipment. The apparatus includes a memory and at least one processor coupled to the memory. The processor is configured to receive, in an initial slot among a plurality of slots, downlink control information (DCI) scheduling a physical downlink shared channel (PDSCH) over the plurality of slots. The DCI may trigger a set of aperiodic zero power channel state information reference signal (A-ZP-CSI-RS) resources. The processor is also configured to receive a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The processor is also further configured to receive a PDSCH transmission in one of the plurality of slots using a rate matching pattern associated with the set of A-ZP-CSI-RS resources.

In another aspect of the subject matter described in this disclosure can be implemented in a method for wireless communication by a user equipment. The method includes receiving, in an initial slot among a plurality of slots, downlink control information (DCI) scheduling a physical downlink shared channel (PDSCH) over the plurality of slots. The DCI may trigger a set of aperiodic zero power channel state information reference signal (A-ZP-CSI-RS) resources. The method also includes receiving a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The method further includes receiving a PDSCH transmission in one of the plurality of slots using a rate matching pattern associated with the set of A-ZP-CSI-RS resources.

In another aspect, the subject matter described in this disclosure can be implemented in an apparatus for wireless communication at a network device. The apparatus includes a memory and at least one processor coupled to the memory. The processor is configured to transmit, in an initial slot among a plurality of slots, downlink control information (DCI) scheduling a physical downlink shared channel (PDSCH) over the plurality of slots. The DCI may trigger a set of aperiodic zero power channel state information reference signal (A-ZP-CSI-RS) resources. The processor is also configured to transmit a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The processor may be further configured to transmit a PDSCH transmission in one of the plurality of slots using a rate matching pattern associated with the set of A-ZP-CSI-RS resources.

In another aspect, the subject matter described in this disclosure can be implemented in a method of wireless communication at a network device. The method includes transmitting, in an initial slot among a plurality of slots, downlink control information (DCI) scheduling a physical downlink shared channel (PDSCH) over the plurality of slots. The DCI may trigger a set of aperiodic zero power channel state information reference signal (A-ZP-CSI-RS) resources. The method may also include transmitting a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The method may further include transmitting a PDSCH transmission in one of the plurality of slots using a rate matching pattern associated with the set of A-ZP-CSI-RS resources.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1A:
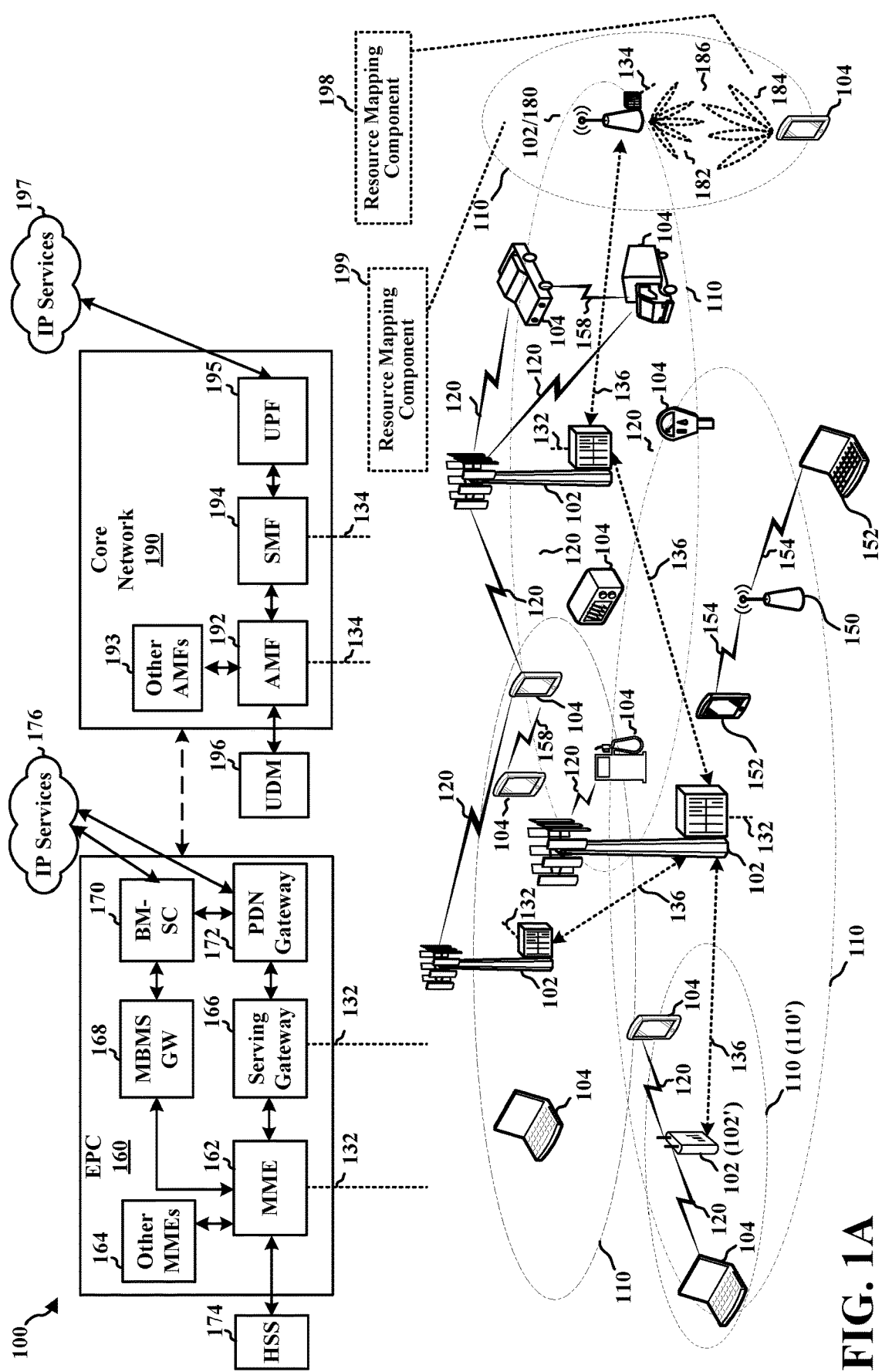
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

A DCI for scheduling of a PDSCH (e.g., DL DCI) comprised in a physical downlink control channel (PDCCH) may trigger a set of A-ZP-CSI-RS resources. The PDSCH data may then be rate matched around the A-ZP-CSI-RS resources (e.g., the A-ZP-CSI-RS resources may mask certain resource elements in a configured pattern of certain resource blocks as unavailable for PDSCH mapping). Currently, a triggered A-ZP-CSI-RS set is applied to all scheduled PDSCH slots. For example, when the UE is configured with multi-slot and single-slot PDSCH scheduling, the triggered A-ZP-CSI-RS is applied to all the slot(s) of the scheduled PDSCH by the PDCCH containing the trigger. However, rate matching may not be necessary for all of the scheduled slots. Thus, it would be helpful if rate matching could be performed on a subset of the scheduled PDSCH slots.

Aspects of the present disclosure allow for more efficient rate matching by allowing a triggered A-ZP-CSI-RS set to support rate matching around multiple slots. Aspects of the present disclosure may allow a triggered A-ZP CSI-RS set to be applied to less than all scheduled PDSCH slots when DCI schedules PDSCH on multiple slots. Aspects of the present disclosure may extend CSI-RS resource mapping to span multiple adjacent slots. In another instance, aspects of the present disclosure allow a resource mapping configuration to indicate an initial symbol of a plurality of symbols spanning the plurality of slots for a respective A-ZP-CSI-RS resource. Doing so also allows a PDSCH transmission in one of the plurality of slots using a rate matching pattern associated with a set of A-ZP-CSI-RE resources to be received. In addition, aspects of the present disclosure can also add periodicity to A-ZP-CSI-RS resource set configuration.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

Wireless communications systems typically use reference signals for various functions such as channel performance measurements, CSI measurements, location tracking, rate matching, beam management, and the like. Reference signals may be scheduled as needed (e.g., aperiodic) or according to a schedule (e.g., according to a periodic schedule, scheduled during a given downlink transmission, and the like). Example reference signals include, but are not limited to, CSI-RS, demodulation reference signal (DMRS), tracking (or position) reference signal (TRS), and the like.

In general, a CSI-RS can be configured for periodic, semi-persistent, or aperiodic transmission. In the case of periodic CSI-RS transmission, a device can assume that a configured CSI-RS transmission occurs every Nth slot. In addition to the periodicity, the device is also configured with a specific slot offset for the CSI-RS transmission. In the case of semi-persistent CSI-RS transmission, a certain CSI-RS periodicity and corresponding slot offset are configured in the same way as for periodic CSI-RS transmission. However, actual CSI-RS transmission can be activated/deactivated based on MAC Control elements. Once the CSI-RS transmission has been activated, the device can assume that the CSI-RS transmission will continue to occur according to the configured periodicity until it is explicitly deactivated. Similarly, once the CSI-RS transmission has been deactivated, the device can assume that there will be no CSI-RS transmissions according to the configuration until it is explicitly reactivated. In the case of aperiodic CSI-RS transmission, no periodicity is configured. Rather, a device is explicitly informed ("triggered") about each CSI-RS transmission instant by means of signaling in the DCI.

ZP-CSI-RS are special empty resource elements (REs), used mostly for interference measurement. ZP-CSI-RS defines a set of REs which do not contain any transmission for the UE, but the REs may contain transmissions for other UE. These REs puncture the PDSCH so the UE does not expect to receive any DL data within them. For example, ZP-CSI-RS is used to configure a RE puncturing pattern for the PDSCH when some REs are allocated for other purposes.

A-ZP-CSI-RS is triggered in DL DCI to indicate PDSCH rate matching around A-NZP-CSI-RS. One example of A-CSI-RS may comprise CSI-RS for tracking, (e.g., which may also be referred to as an aperiodic tracking reference signal (A-TRS)) or for beam management (BM)/channel state information (CSI) measurement. Instead of introducing a separate type of reference signal for tracking purposes, NR defines a set of CSI-RS resources for tracking which is labeled with higher layer parameter. For downlink BM (as well as uplink BM), when beam correspondence is supported by the UE, CSI-RS resource set is configured for the UE to select preferred downlink transmit beam(s) (i.e., spatial domain transmission filter). For CSI measurement, UE may perform measurements for CSI report.

A downlink control information (DCI) may be used to schedule a PDSCH (e.g., DL DCI) over multiple slots. The DCI may trigger a set of aperiodic zero-power Channel State Information Reference Signal (A-ZP-CSI-RS) reference signal resources. Accordingly, when the user equipment (UE) is configured with multi-slot and single-slot PDSCH scheduling, the triggered A-ZP-CSI-RS is applied to all of the slot(s) of the scheduled PDSCH by the trigger. However, in multi-slot scenarios, rate matching may not actually be necessary for all of the scheduled PDSCH slots. Instead, rate matching may only need to be performed on a subset of the scheduled PDSCH slots.

A resource mapping configuration may be implemented to indicate an initial symbol of a plurality of symbols spanning the plurality of symbols for a respective A-ZP-CSI-RS resource. The UE may receive at least one PDSCH transmission in one of the plurality of slots using a rate matching pattern associated with the A-ZP-CSI-RS resources. This allows rate matching around ZP-CSI-RS to a single slot or a subset of slots of the scheduled PDSCH rather than rate matching around ZP-CSI-RS to all slots of the scheduled PDSCH. This enhancement for multi-slot PDSCH rate matching ensures that proper rate matching may be performed around a certain slot(s) of the scheduled PDSCH— rather than wasting resources by applying the rate matching to all the slots of the scheduled PDSCH.

Thus, to avoid wasting resources and rate matching for all scheduled slots, a resource mapping configuration associated with a set of A-ZP-CSI-RS resources may be expanded to span a plurality of slots. In particular, the resource mapping configuration may indicate an initial symbol of a plurality of symbols spanning the plurality of slots for a respective A-ZP-CSI-RS resource in the set of A-ZP-CSI-RS resources.

FIG. 1A is a diagram illustrating an example of a wireless communications system and an access network 100. The wireless communications system (also referred to as a wireless wide area network (WWAN)) includes network devices 102, user equipment(s) (UE) 104, an Evolved Packet Core (EPC) 160, and another core network 190 (e.g., a 5G Core (5GC)). The network devices 102 may include macrocells, such as high power cellular network devices, and/or small cells, such as low power cellular network devices (including femtocells, picocells, and microcells). In some aspects, the network device may include a base station (BS).

The network devices 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The network devices 102 configured for 5G New Radio (NR), which may be collectively referred to as the Next Generation Radio Access Network (RAN) (NG-RAN), may interface with a core network 190 through second backhaul links 134. In addition to other functions, the network devices 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the network devices 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the network devices 102 may be configured for integrated access and backhaul (IAB). Accordingly, such network devices may wirelessly communicate with other network devices, which also may be configured for IAB.

At least some of the network devices 102 configured for IAB may have a split architecture including multiple units, some or all of which may be collocated or distributed and which may communicate with one another.

The network devices 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the network devices 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro network devices 102. A network that includes both small cells and macrocells may be known as a heterogeneous network. A heterogeneous network may also include Home Evolved Node BS (eNBs) (HeNBs), which may provide service to a restricted group known as a closed subscriber group (CSG).

The communication links 120 between the network devices 102 and the UEs 104 may include uplink (also referred to as reverse link) transmissions from a UE 104 to a network device 102 and/or downlink (also referred to as forward link) transmissions from a network device 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The network devices 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a network device at the access network level and to at least one core network entity (e.g., AMF and/or MME) at the core network level, and the UE may be configured to receive downlink control information in the access network (e.g., the UE may be in an RRC Connected state). In some instances, in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A network device 102 may be implemented as a macro network device providing a large cell or may be implemented as a small cell 102' having a small cell coverage area. Some network devices 102 may operate in a traditional sub-6 GHz (or sub-7 GHz) spectrum, in mmW frequencies, and/or near-mmW frequencies in communication with the UE 104. When such a network device operates in mmW or near-mmW frequencies, the network device may be referred to as a mmW network device 180. The mmW network device 180 may utilize beamforming 186 with the UE 104 to compensate for the path loss and short range. The network device 180 and the UE 104 may each include a plurality of antennas, such as antenna elements, antenna panels, and/or antenna arrays to facilitate the beamforming.

The network device 180 may transmit a beamformed signal to the UE 104 in one or more transmit directions 182. The UE 104 may receive the beamformed signal from the network device 180 in one or more receive directions 184. The UE 104 may also transmit a beamformed signal to the network device 180 in one or more transmit directions. The network device 180 may receive the beamformed signal from the UE 104 in one or more receive directions. One or both of the network device 180 and/or the UE 104 may perform beam training to determine the best receive and/or transmit directions for the one or both of the network device 180 and/or UE 104. The transmit and receive directions for the network device 180 may or may not be the same. The transmit and receive directions for the UE 104 may or may not be the same.

In various different aspects, one or more of the network devices 102/180 may include and/or be referred to as a gNB, Node B, eNB, an access point, a base transceiver station, a radio network device, a radio transceiver, a transceiver function, a basic service set (BSS), an extended service set (ESS), a transmit reception point (TRP), or some other suitable terminology.

In some aspects, one or more of the network devices 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the network devices 102 belonging to a Multicast Broadcast Single Frequency Network (MBSFN) area broadcasting a particular service, and may be responsible for session management (start/stop) and for collecting eMBMS related charging information.

In some other aspects, one or more of the network devices 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, network device, or a network equipment, such as a BS, or one or more units (or one or more components) performing network device functionality, may be implemented in an aggregated or disaggregated architecture. For example, a BS (such as a Node B (NB), eNB, NR BS, 5G NB, access point (AP), a TRP, or a cell, etc.) may be implemented as an aggregated network device (also known as a standalone BS or a monolithic BS) or a disaggregated network device.

An aggregated network device may be configured to utilize a radio protocol stack that is physically or logically integrated within a single RAN node. A disaggregated network device 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Network device-type operation or network design may consider aggregation characteristics of network device functionality. For example, disaggregated network devices may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated network device, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring back to FIG. 1A, in certain aspects, the UE 104 may include a resource mapping component 198 that is configured to: receive, in an initial slot among a plurality of slots, DCI scheduling a PDSCH over the plurality of slots. The DCI may trigger a set of A-ZP-CSI-RS resources. The resource mapping component 198 may also be configured to receive, in an initial slot among a plurality of slots, DCI scheduling a PDSCH over the plurality of slots. The DCI may trigger a set of A-ZP-CSI-RS resources. The resource mapping component 198 may also be configured to receive a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The resource mapping component 198 may further be configured to receive a PDSCH transmission in one of the plurality of slots using a rate matching pattern associated with the set of A-ZP-CSI-RS resources.

Referring back to FIG. 1A, in certain aspects, the network device 180 (e.g., network entity or a network node, such as a gNB) may include a resource mapping component 199 that is configured to transmit, in an initial slot among a plurality of slots, DCI scheduling a PDSCH over the plurality of slots. The DCI may trigger a set of A-ZP-CSI-RS resources. The resource mapping component 199 may also be configured to transmit a resource mapping configuration associated with the set of A-ZP-CSI-RS resources. The resource mapping configuration may indicate an initial symbol of a plurality of symbols spanning the plurality of slots for a respective A-ZP-CSI-RS resource in the set of A-ZP-CSI-RS resources. The resource mapping component 199 may further be configured to transmit a PDSCH transmission in one of the plurality of slots using a rate matching pattern associated with the set of A-ZP-CSI-RS resources.

Figure 1B:
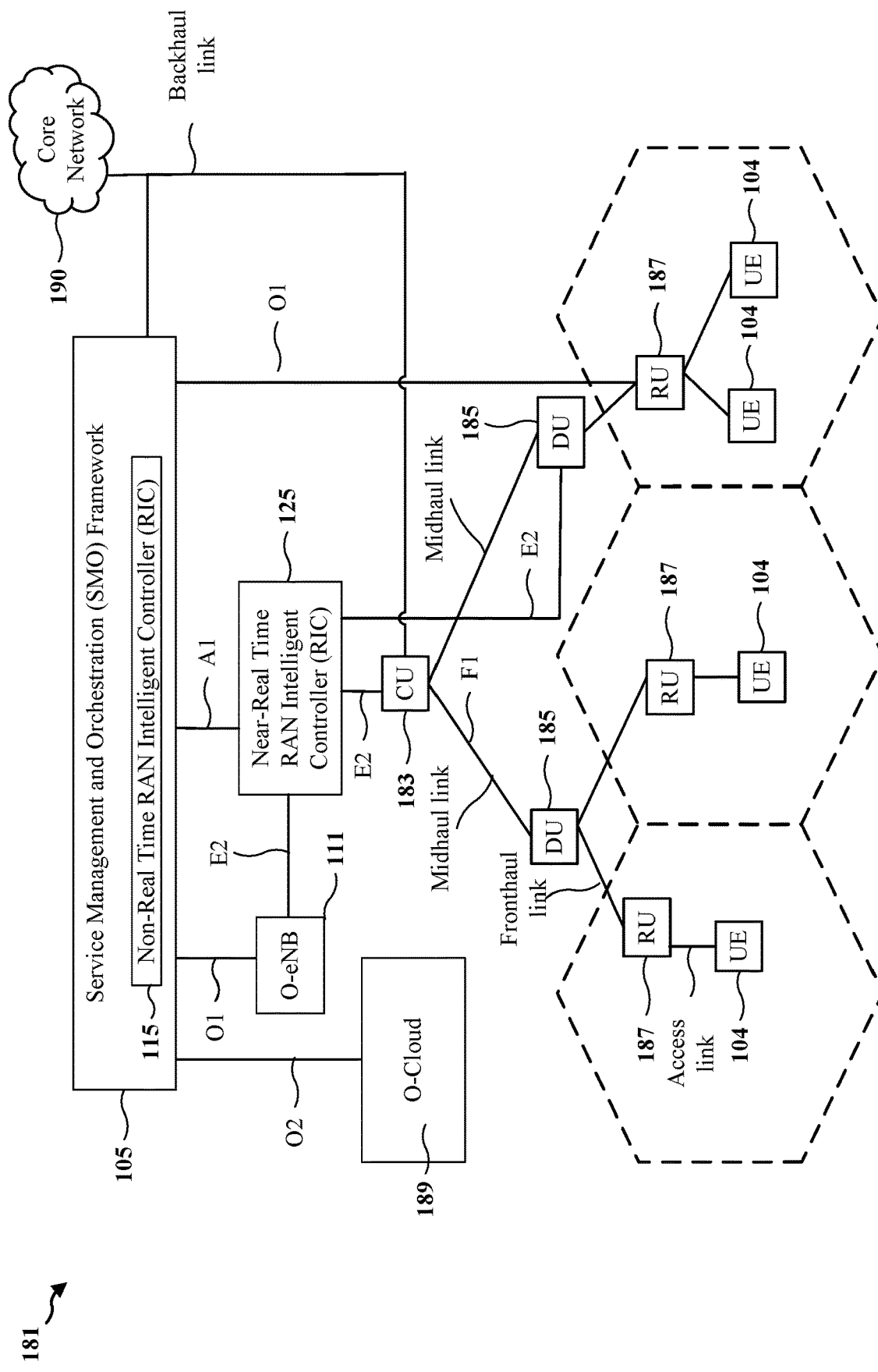
FIG. 1B is a conceptual diagram of an example Open Radio Access Network architecture.

FIG. 1B shows a diagram illustrating an example disaggregated network device 181 architecture. The disaggregated network device 181 architecture may include one or more CUs 183 that can communicate directly with core network 190 via a backhaul link, or indirectly with the core network 190 through one or more disaggregated network device units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit—User Plane (CU-UP)), control plane functionality (i.e., Central Unit—Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more network device functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

FIG. 2A is a diagram illustrating an example of a first subframe 200 within a 5G NR frame structure. FIG. 2B is a diagram illustrating an example of downlink channels within a 5G NR subframe 230. FIG. 2C is a diagram illustrating an example of a second subframe 250 within a 5G NR frame structure. FIG. 2D is a diagram illustrating an example of uplink channels within a 5G NR subframe 280. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A and 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 microseconds (µs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as Rx for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1A) may use the PSS to determine subframe/symbol timing and a physical layer identity. A secondary synchronization signal (SSS) may be within symbol 4 of particular subframes of a frame. A UE (such as a UE 104 of FIG. 1A) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the network device. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a network device for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
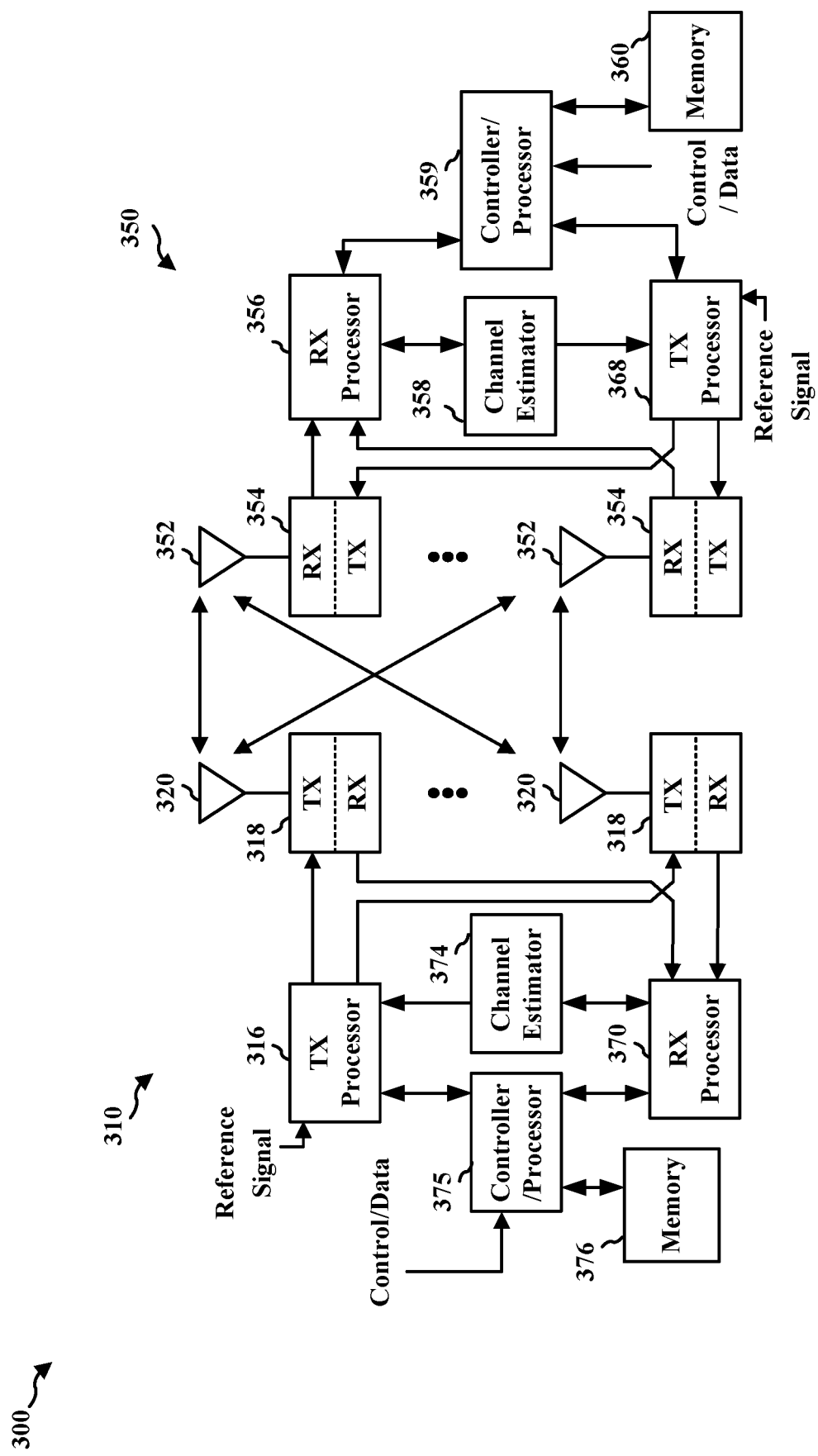
FIG. 3 is a diagram illustrating an example of a network device and user equipment (UE) in an access network.

FIG. 3 is a block diagram of a network device 310 in communication with a UE 350 in an access network 300. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the network device 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the resource mapping component 198 of FIG. 1A.

At least one of the TX processor 316, the RX processor 370, and the controller/processor 375 may be configured to perform aspects in connection with the resource mapping component 199 of FIG. 1A.

The UE 350 can be configured with one or more ZP-CSI-RS resource set configurations, with each ZP CSI-RS resource set consisting of a number of ZP CSI-RS resources. Since A-ZP-CSI-RS resource configuration consists of a set of RE resources with time and frequency pattern as of a CSI-RS resource and, with corresponding configuration and indication from the network, the UE will then assume the RE resources associated with the ZP CSI-RS resource(s) are not mapped for PDSCH transmission. A-ZP-CSI-RS resource set may consist of resource mapping for up to 16 ZP-CSI-RS resources within one slot. Notably, a periodicity and offset configuration for CSI resources (e.g., CSI-ResourcePeriodicityAndOffset) is not configured for A-ZP-CSI-RS resource set configuration.

Currently, a time domain configuration for CSI resources (e.g., firstOFDMSymbolInTimeDomain/firstOFDMSymbolInTimeDomain2) is restricted to symbols within one slot. To support rate matching around multi-slot A-CSI-RS/A-TRS, the value range of the time domain configuration may be extended to span multiple adjacent slots. For example, in fast SCell activation, A-TRS is configured over two adjacent slots. To trigger rate matching around the two slot A-TRS, a network device may configure ZP-CSI-RS resource set with 4 ZP-CSI-RS resources over two adjacent slots. Aspects of the present disclosure allow the time domain configuration for CSI resources for 4 ZP-CSI-RS resources can be configured as {6, 10, 20, 26}.

To avoid wasting resources by rate matching for all scheduled PDSCH slots, a resource mapping configuration associated with a set of A-ZP-CSI-RS resources may indicate an initial symbol of a plurality of symbols spanning a plurality of slots for a respective A-ZP-CSI-RS resource in the set of A-ZP-CSI-RS resources. Accordingly, when DCI scheduling multi-slot PDSCH triggers ZP-CSI-RS, DCI may indicate slot offset of triggered ZP-CSI-RS to rate match around ZP-CSI-RS such that rate matching is applied to a single PDSCH slot using the slot offset. Similarly, in scenarios where multiple A-ZP-CSI-RS are to be triggered, periodicity can also be added to A-ZP-CSI-RS resource set configuration to support rate matching around multiple A ZP-CSI-RS. When DL DCI scheduling multi-slot PDSCH triggers multiple ZP-CSI-RS, DCI can indicate the slot offset and a number of repetitions for ZP-CSI-RS rate matching around ZP-CSI-RS such that rate matching is only applied to a subset of PDSCH slots using the slot offset, the slot periodicity, and the number of repetitions. In both of the scenarios described above, a resource mapping configuration associated with a set of A-ZP-CSI-RS resources can be implemented for multi-slot PDSCH rate matching by using a rate matching pattern associated with the set of A-ZP-CSI-RS resources.

Figure 4:
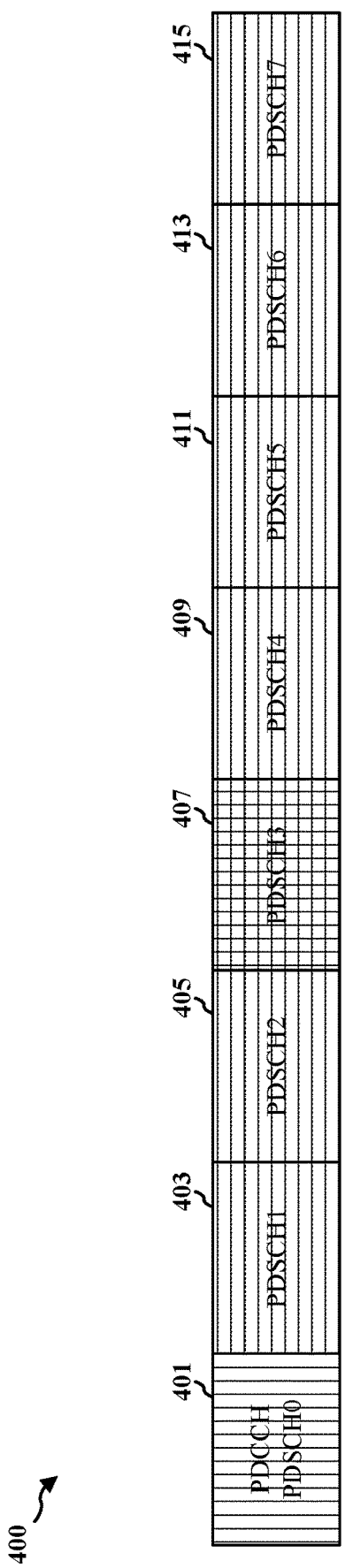
FIG. 4 is a diagram illustrating an example of an A-ZP-CSI-RS enhancement for multi-slot PDSCH rate matching around a single slot.

FIG. 4 illustrates an example 400 depicting an A-ZP-CSI-RS enhancement for multi-slot PDSCH rate matching around a single slot. In this example, DCI may indicate a slot offset value for receiving PDSCH transmission in one of the plurality of slots based on a rate matching pattern. When DL DCI scheduling multi-slot PDSCH triggers ZP-CSI-RS, DCI can indicate a slot offset value of a triggered set of ZP-CSI-RS resources which slot offset value indicates one of the plurality of slots in which the UE may receive a PDSCH transmission using a rate matching pattern associated with the set of A-ZP-CSI-RS resources.

For instance, in the example 400, a DCI scheduling a PDSCH is received in an initial slot 401 among a plurality of eight slots. Specifically, in example 400, the DCI schedules PDSCH over the eight slots. A resource mapping configuration indicating an initial symbol of a plurality of symbols spanning the eight slots for a respective A-ZP-CSI-RS resource in the set of A-ZP-CSI-RS resources is received by the UE from the network device. In example 400, which should not be limiting, the DCI indicates that a set of A-ZP-CSI-RS resources is to be triggered with offset 3. Accordingly, a rate matching pattern is determined by rate matching around the set of ZP-CSI-RS resources being applied only to PDSCH3 407—rather than rate matching around the set of ZP-CSI-RS resources being applied to all eight scheduled PDSCH slots 401, 403, 405, 407, 409, 411, 413, 415. Thus, a PDSCH transmission is received in the PDSCH 3 407 using a rate matching pattern associated with the set of A-ZP-CSI-RS resources (e.g., a A-ZP-CSI-RS trigger with offset 3).

Figure 5:
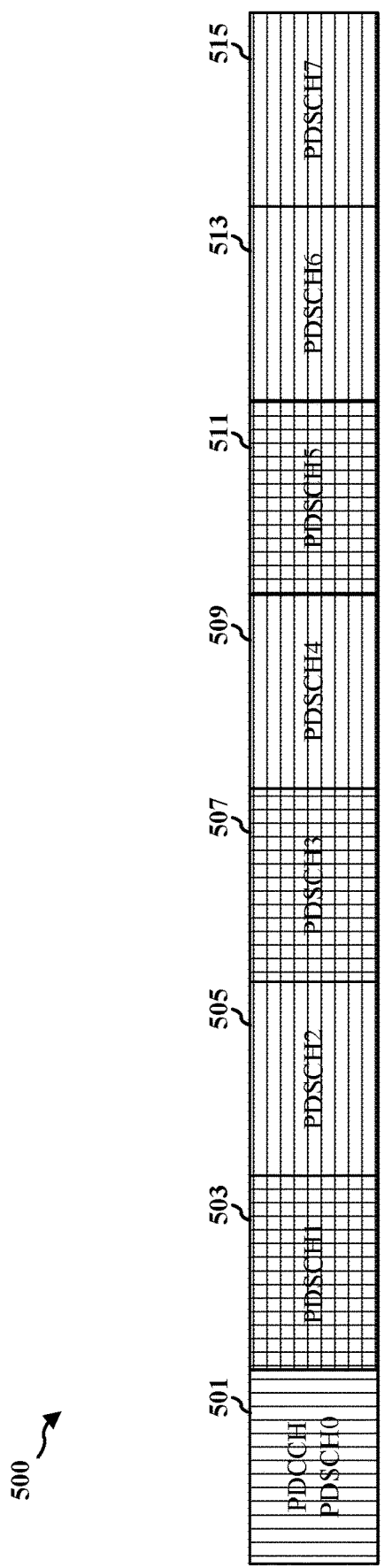
FIG. 5 is a diagram illustrating an example of an A-ZP-CSI-RS enhancement for multi-slot PDSCH rate matching around multiple slots.

FIG. 5 illustrates an example 500 depicting an A-ZP-CSI-RS enhancement for multi-slot PDSCH rate matching around multiple slots. In this example, the resource mapping configuration may indicate a slot periodicity for A-ZP-CSI-RS. Currently, periodicity is not configured in A-ZP-CSI-RS resource set configurations. As such, to support rate matching around multiple A-CSI-RS/A-TRS, slot periodicity may be configured from a set of A-ZP-CSI-RS resource set configuration. In addition, DCI may further indicate a number of slot repetitions. When DL scheduling multi-slot PDSCH over a plurality of slots triggers a set of ZP-CSI-RS resources, a resource mapping configuration associated with the set of A-ZP-CSI-RS resources may indicate an initial symbol of a plurality of symbols spanning the plurality of slots for a respective A-ZP-CSI-RS resource in the set of A-ZP-CSI-RS resources.

In contrast to example 400 from FIG. 4, where an A-ZP-CSI-RS enhancement for multi-slot PDSCH rate matches around a single slot, FIG. 5 shows an example 500 where an A-ZP-CSI-RS enhancement for multi-slot PDSCH rate matches around multiple slots. When multiple sets of A-ZP-CSI-RS resources are triggered, periodicity may be added to a resource mapping configuration associated with a set of A-ZP-CSI-RS resources. Periodicity is currently not configured in A-ZP-CSI-RS resource set configuration. Accordingly, to support rate matching around multiple slots of a scheduled PDSCH, slot periodicity may be configured from the set of A-ZP-CSI-RS resources. In addition, when DCI scheduling multi-slot PDSCH triggers ZP-CSI-RS, DCI can also indicate a number of repetitions for ZP-CSI-RS.

In example 500, a DCI scheduling a PDSCH is received in an initial slot 501 among a plurality of 8 slots. Specifically, in example 500, the DCI schedules PDSCH over the 8 slots. A resource mapping configuration indicating an initial symbol of a plurality of symbols spanning the 8 slots for a respective A-ZP-CSI-RS resource in the set of A-ZP-CSI-RS resources is received by the UE from the network device. In this example, the DCI indicates that a set of ZP-CSI-RS resources is to be triggered with offset 1. By way of example, which should not be construed as limiting, the slot periodicity is configured as 2 in the resource mapping configuration and the DCI indicates a number of slot repetitions as 3. Accordingly, as shown in example 500, a rate matching pattern is determined by rate matching around the multiple set of ZP-CSI-RS resources being applied to PDSCH1 503, PDSCH 3 507, and PDSCH 5 511—rather than the rate matching pattern around the set of ZP-CSI-RS resources being applied to all 8 scheduled PDSCH slots. Thus, a PDSCH transmission is received in the PDSCH1 503, PDSCH 3 507, and PDSCH 5 511 using a rate matching pattern associated with the set of A-ZP-CSI-RS resources (e.g., a ZP-CSI-RS trigger with offset 3, periodicity 2, and number of repetitions 3). Although, this example describes specific numbers, but these specific numbers are merely illustrative of this disclosure rather than limiting.

Figure 6:
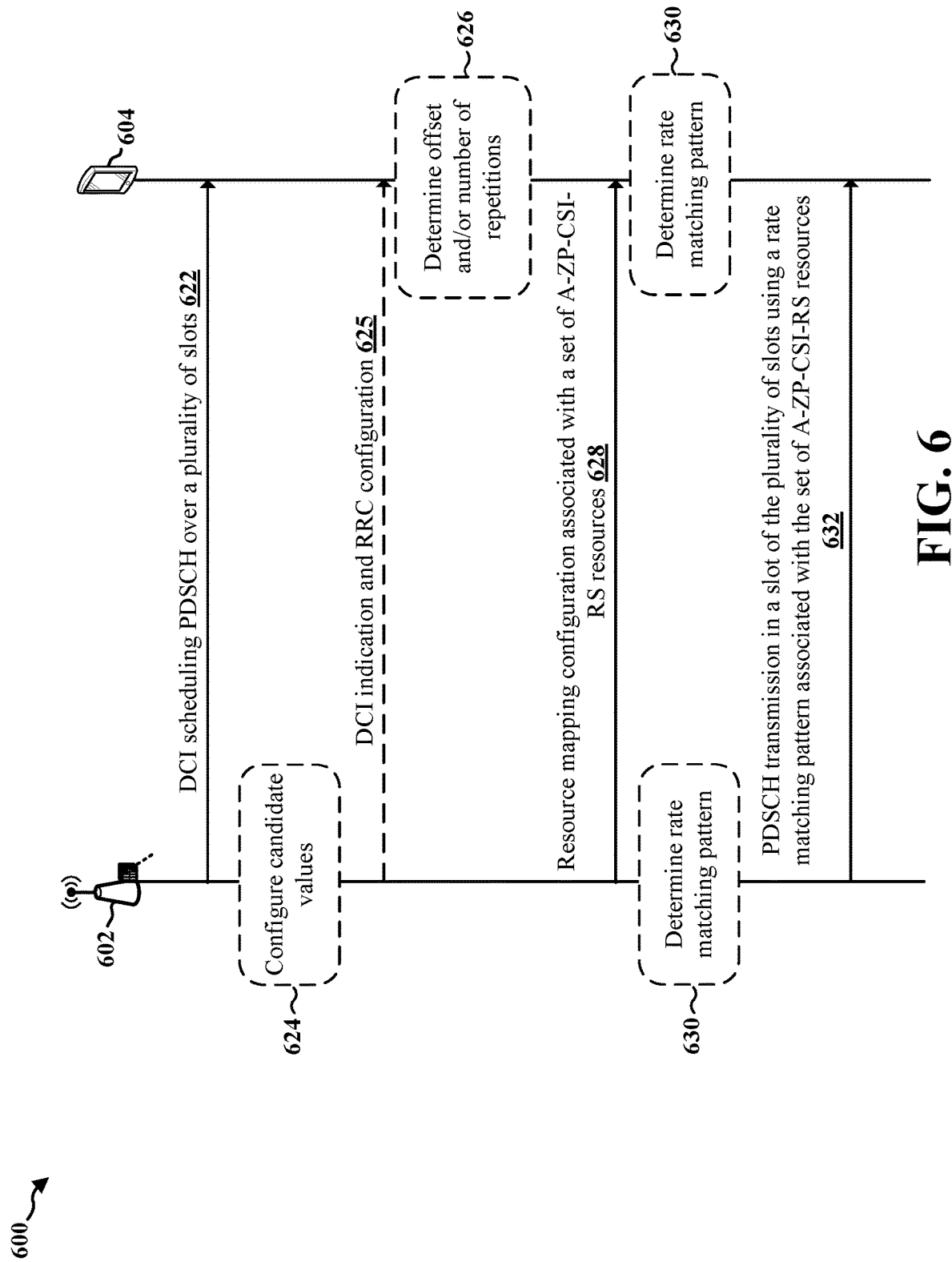
FIG. 6 illustrates a call flow diagram between a network device and UE.

FIG. 6 is a call flow 600 diagram between a network device 602 and a UE 604. A call flow 600 illustrates an exemplary sequence of operations performed between the network device 602 and UE 604 to extend CSI-RS resource mapping to span multiple adjacent slots. For example, call flow 600 depicts operations for allowing a resource mapping configuration to indicate an initial symbol of a plurality of symbols spanning the plurality of slots for a respective a-ZP-CSI-RS resource. It is understood that one or more of the operations described in call flow 600 may be performed earlier or later in the process, omitted, replaced, supplemented, or combined with another operation. Also, additional operations described herein that are not included in call flow 600 may be included in call flow 600.

The UE 604 may correspond to UE 104, 350 and apparatus 902. The network device 602 may correspond to network device 102/180, 310 and apparatus 1002

At 622, the UE 604 may receive DCI scheduling a PDSCH over a plurality of slots. The DCI may trigger a set of A-ZP-CSI-RS resources, for example, as shown in example 400 from FIG. 4 and example 500 from FIG. 5. In other aspects, the DCI can be configured in a PDCCH. PDCCH decoding in one slot (e.g., one DCI, multiple DCI) supports scheduled PDSCH/PUSCH transmission over multiple slots. The PDCCH may carry control information about data being transmitted and information for the UE 604 with regards to the resources the UE 604 needs to use for a scheduled UL or a scheduled DL reception. The UE 604 decodes the received PDCCH, such that the UE may determine a scheduled slot index for the channel scheduled by the PDCCH. In some aspects, the PDCCH may schedule a channel to instruct the UE to prepare for a DL reception. For example, a grant in a PDCCH may schedule a physical downlink shared channel (PDSCH) for the UE, such that the UE received instructions for a scheduled DL reception via the PDSCH at the scheduled slots. The scheduled slot may be determined by the scheduling PDCCH slot index as a reference plus a signaled slot offset.

In some aspects, at 624, the network device 602 may configure candidate values of offset for A-ZP-CSI-RS via RRC. For example, a bit size of the DCI field to indicate offset value for A-ZP-CSI-RS may be determined according to a number of RRC-configured candidate values. In some aspects, the network device 602 may configure candidate values of a number of repetitions for A-ZP-CSI-RS via RRC. For example, a bit size of the DCI field to indicate a number of repetitions for A-ZP-CSI-RS may be determined according to a number of RRC-configured candidate values. In an aspect, the network device 602 may transmit a DCI indication and RRC configuration to the UE 604.

In some aspects, at 626, UE 604 may determine the offset value based on a DCI indication and RRC-configured candidate value based on the DCI indication and RRC configuration for candidate values. In some aspects, at 625, the UE 604 may determine the number of repetitions based on DCI indication and RRC configuration for candidate values.

At 628, the UE 604 may be configured to receive a resource mapping configuration associated with the set of A-ZP-CSI-RS resources. In some aspects, the resource mapping configuration indicates an initial symbol of a plurality of symbols spanning the plurality of slots for a respective A-ZP-CSI-RS resource in the set of A-ZP-CSI-RS resources, for example, as shown in example 400 from FIG. 4 and example 500 from FIG. 5.

In some aspects, at 630, the UE 604 and network device 602 may be configured to determine a rate matching pattern based at least in part on an initial symbol from the resource mapping configuration. In some aspects, the network device 602 may rate match the scheduled PDSCH around the A-CSI-RS resources as indicated in the resource mapping configuration. The rate matching pattern may include performing rate matching around a scheduled slot. In some aspects, determining the rate matching pattern may include determining which slots of the plurality of slots to perform rate matching around the triggered set of ZP-CSI-RS resources.

The UE 604 may be configured to receive a PDSCH transmission in one of the plurality of slots using a rate matching pattern associated with the set of A-ZP-CSI-RS resources 632.

In this way, extending CSI-RS resource mapping to span multiple adjacent slots may allow for more efficient rate matching. Accordingly, when DL DCI scheduling multi-slot PDSCH triggers ZP-CSI-RS, DCI can indicate the offset of triggered ZP-CSI-RS. This allows a PDSCH transmission in one of the plurality of slots using a rate matching pattern associated with a set of A-ZP-CSI-RE resources to be received by the UE.

Figure 7:
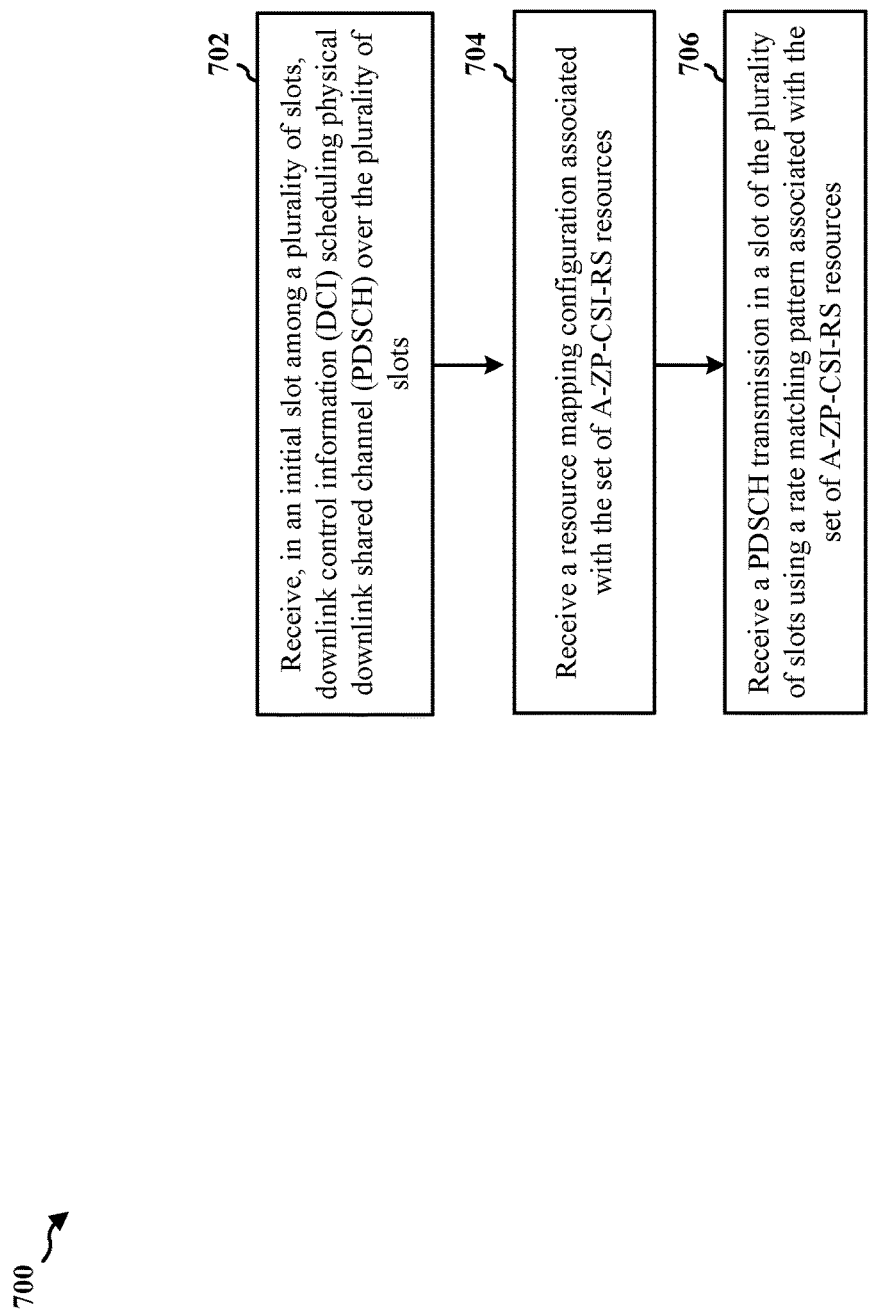
FIG. 7 illustrates example flowcharts illustrating a method of wireless communication at a UE.

FIG. 7 is a flowchart of an method 700 of wireless communication at a UE. The method 700 may be performed by or at a UE (e.g., the UE 104, 350, 604), another wireless communications apparatus (e.g., the apparatus 902), or one or more components thereof. According to various different aspects, one or more of the illustrated methods 700 may be omitted, transposed, and/or contemporaneously performed. This method 700 allows for extending CSI-RS resource mapping to span multiple adjacent slots.

The method 700 may be performed by an apparatus, such as a resource mapping component 198, as described above. In some implementations, the method 700 is performed by processing logic, including hardware, firmware, software, or a combination thereof. In some implementations, the method 700 is performed by a processor executing code stored in a non-transitory computer-readable medium (e.g., a memory).

At operation 702, the UE receives, in an initial slot among a plurality of slots, DCI scheduling a PDSCH over the plurality of slots. For example, referring to FIG. 6, the UE 604 may receive DCI scheduling a PDSCH over a plurality of slots 622 from the network device 602. In some aspects, the DCI indicates a slot offset value. The DCI triggers a set of A-ZP-CSI-RS resources. A slot of the plurality of slots is based on the slot offset value. In some aspects the slot offset value is based on a DCI indication and a RRC configuration. In some aspects, the number of slot repetitions is indicated by a length of a field in the DCI according to a number of a RRC-configured candidate values.

In some aspects, the resource mapping configuration indicates a slot periodicity. The rate matching pattern is based on the slot periodicity with respect to the slot offset value and a number of slot repetitions. In some aspects, the slot periodicity is configured from the set of A-ZP-CSI-RS resources. In some aspects, the DCI indicates the number of slot repetitions. In some aspects, the number of slot repetitions is based on a DCI indication and a radio resource control (RRC) configuration. In some aspects, the number of slot repetitions is indicated by a length of a field in the DCI according to a number of a RRC-configured candidate values.

At operation 704, the UE receives a resource mapping configuration associated with the set of A-ZP-CSI-RS resources. The resource mapping configuration indicates an initial symbol of a plurality of symbols spanning the plurality of slots for a respective A-ZP-CSI-RS resource in the set of A-ZP-CSI-RS resources. For example, referring to FIG. 6, the UE 604 may receive the resource mapping configuration associated with the set of A-ZP-CSI-RS resources 628 from the network device 602.

At operation 706, the UE receives a PDSCH transmission in a slot of the plurality of slots using a rate matching pattern associated with the set of A-ZP-CSI-RS resources. In some aspects, the rate matching is based at least in part on the resource mapping configuration. For example, referring to FIG. 6, the UE 604 may receive a PDSCH transmission in one of the plurality of slots using a rate matching pattern associated with the set of A-ZP-CSI-RS resources 632 from the network device 602. For example, referring to FIG. 4, a PDSCH transmission is received in the PDSCH 3 407 using a rate matching pattern associated with the set of A-ZP-CSI-RS resources (e.g., a A-ZP-CSI-RS trigger with offset 3). As another example, referring to FIG. 5, a PDSCH transmission is received in the PDSCH1 503, PDSCH 3 507, and PDSCH 5 511 using a rate matching pattern associated with the set of A-ZP-CSI-RS resources (e.g., a ZP-CSI-RS trigger with offset 1, periodicity 2, and number of repetitions 3).

Figure 8:
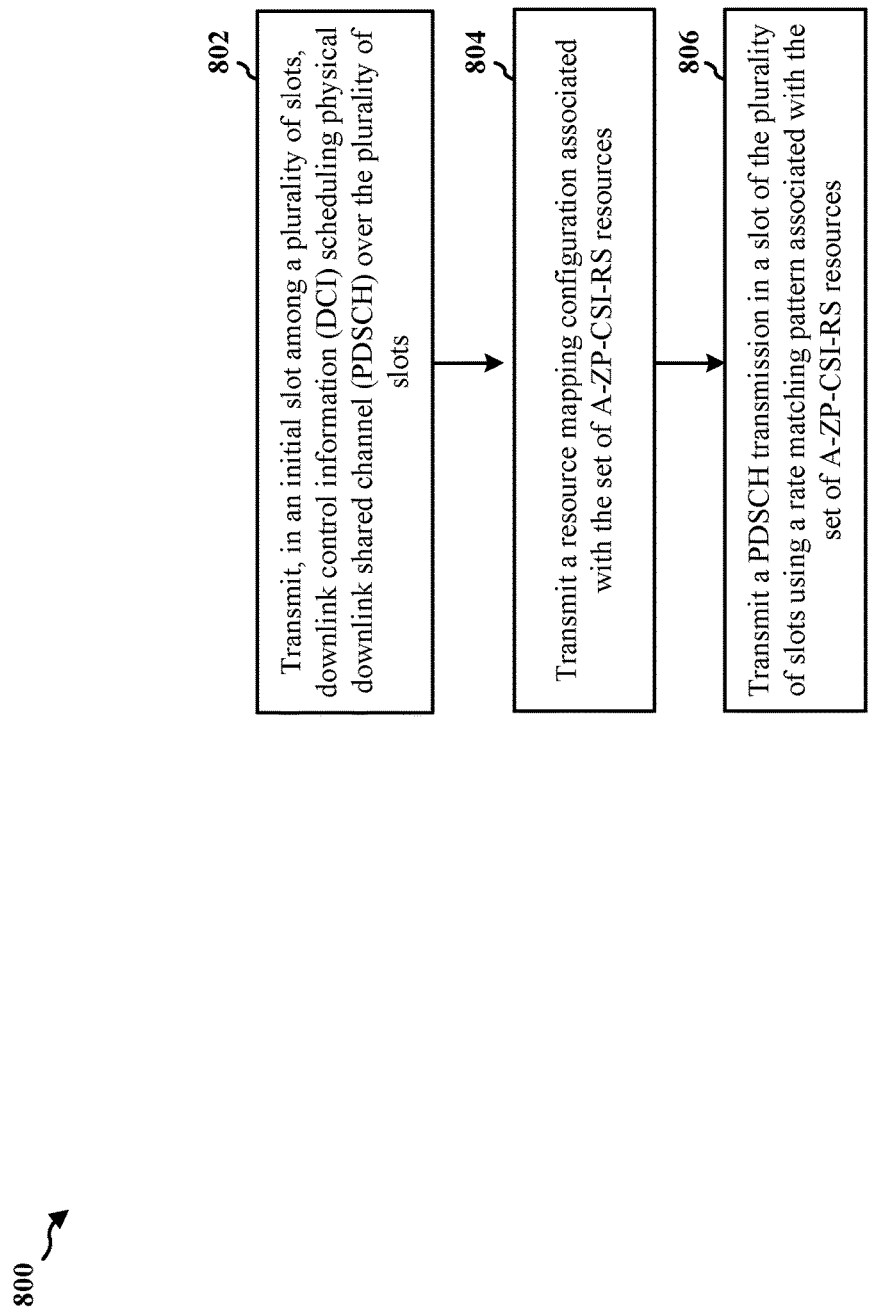
FIG. 8 illustrates example flowcharts illustrating a method of wireless communication at a network device.

FIG. 8 is a flowchart of a method 800 of wireless communication at a network device. The method 800 may be performed by or at a network device (e.g., the network device 102/180, 310, 602), another wireless communications apparatus (e.g., the apparatus 1002), or one or more components thereof. According to various different aspects, one or more of the illustrated blocks may be omitted, transposed, and/or contemporaneously performed. This method 800 allows for extending CSI-RS resource mapping to span multiple adjacent slots.

The method 800 may be performed by an apparatus, such as a resource mapping component 199 as described above. In some implementations, the method 800 is performed by processing logic, including hardware, firmware, software, or a combination thereof. In some implementations, the method 800 is performed by a processor executing code stored in a non-transitory computer-readable medium (e.g., a memory)

At operation 802, the network device transmits, in an initial slot among a plurality of slots, DCI scheduling a PDSCH over the plurality of slots. The DCI triggers a set of A-ZP-CSI-RS resources. For example, referring to FIG. 6, the network device 602 may transmit DCI scheduling a PDSCH over a plurality of slots 622 to the UE 604. In some aspects, the slot offset value is based on a DCI indication and a RRC configuration.

In some aspects, the resource mapping configuration indicates a slot periodicity. The rate matching pattern is based on the slot periodicity with respect to the slot offset value and a number of slot repetitions. In some aspects, the slot periodicity is configured from the set of A-ZP-CSI-RS resources. In some aspects, the DCI indicates the number of slot repetitions. In some aspects, the number of slot repetitions is indicated by a length of a field in the DCI according to a number of a RRC-configured candidate values. In some aspects, the slot offset value is based on a DCI indication and a RRC configuration. In some aspects, the slot offset value is indicated by a length of field in the DCI according to a number of RRC-configured candidate values.

At operation 804, the network device transmits a resource mapping configuration associated with the set of A-ZP-CSI-RS resources. The resource mapping configuration indicates an initial symbol of a plurality of symbols spanning the plurality of slots for a respective A-ZP-CSI-RS resource in the set of A-ZP-CSI-RS resources. For example, referring to FIG. 6, the network device 602 may transmit the resource mapping configuration associated with the set of A-ZP-CSI-RS resources 628 to the UE 604.

At operation 806, the network device transmits a PDSCH transmission in one of the plurality of slots using a rate matching pattern associated with the set of A-ZP-CSI-RS resources. In an aspect, the rate matching pattern is based at least in part on the resource mapping configuration. For example, referring to FIG. 6, the network device 602 may transmit a PDSCH transmission in one of the plurality of slots using a rate matching pattern associated with the set of A-ZP-CSI-RS resources 632 to the UE 604. For example, referring to FIG. 4, the network device 602 transmits a PDSCH transmission in the PDSCH 3 407 using a rate matching pattern associated with the set of A-ZP-CSI-RS resources (e.g., a A-ZP-CSI-RS trigger with offset 3). As another example, referring to FIG. 5, the network device 602 transmits a PDSCH transmission in the PDSCH1 503, PDSCH 3 507, and PDSCH 5 511 using a rate matching pattern associated with the set of A-ZP-CSI-RS resources (e.g., a ZP-CSI-RS trigger with offset 1, periodicity 2, and number of repetitions 3).

Figure 9:
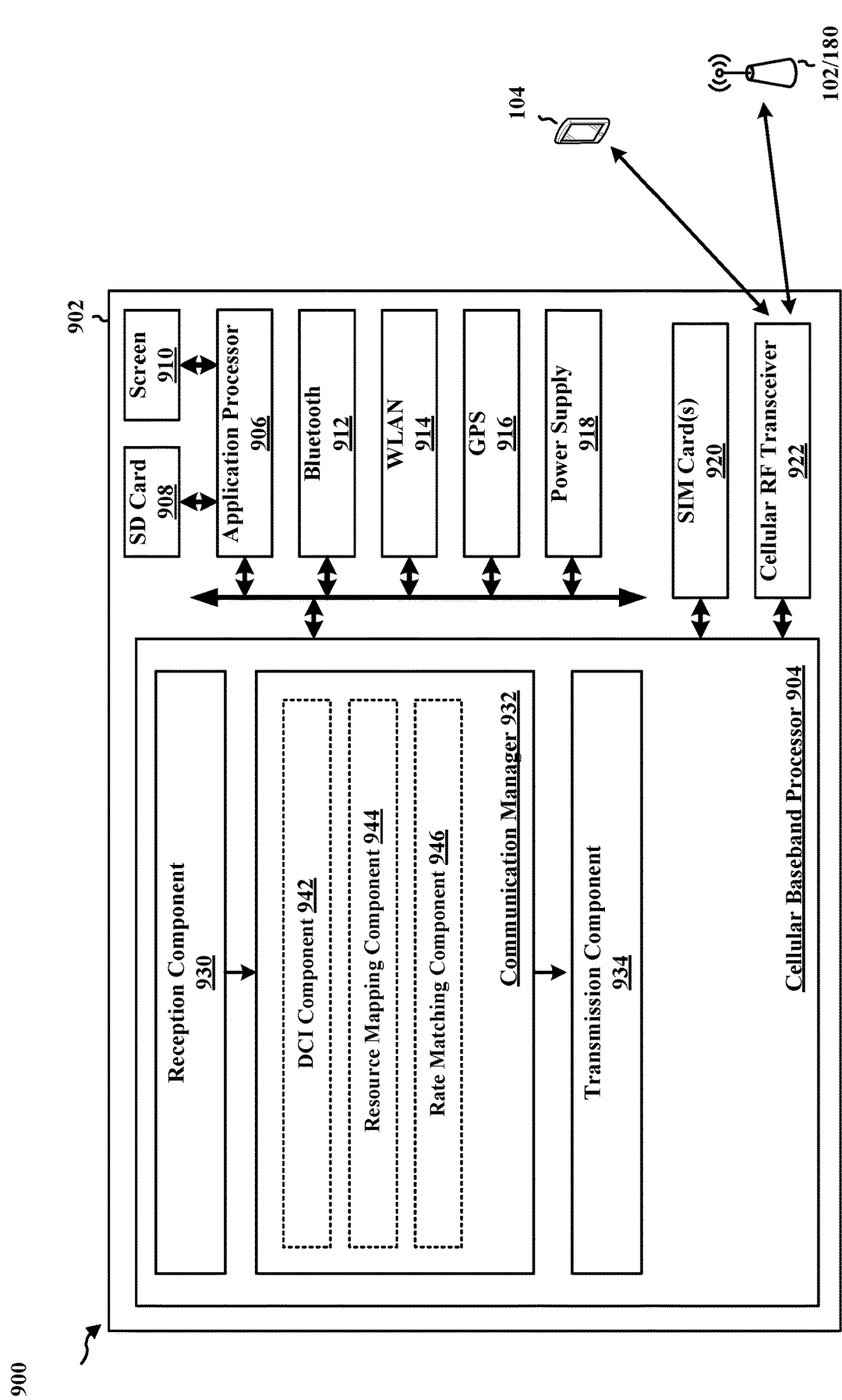
FIG. 9 is a diagram illustrating an example of a hardware implementation for an example apparatus.

FIG. 9 is a diagram 900 illustrating an example of a hardware implementation for an apparatus 902. The apparatus 902 may be a UE or similar device, or the apparatus 902 may be a component of a UE or similar device. The apparatus 902 may include a cellular baseband processor 904 (also referred to as a modem) and/or a cellular RF transceiver 922, which may be coupled together and/or integrated into the same package, component, circuit, chip, and/or other circuitry.

In some aspects, the apparatus 902 may accept or may include one or more subscriber identity modules (SIM) cards 920, which may include one or more integrated circuits, chips, or similar circuitry, and which may be removable or embedded. The one or more SIM cards 920 may carry identification and/or authentication information, such as an international mobile subscriber identity (IMSI) and/or IMSI-related key(s). Further, the apparatus 902 may include one or more of an application processor 906 coupled to a secure digital (SD) card 908 and a screen 910, a Bluetooth module 912, a wireless local area network (WLAN) module 914, a Global Positioning System (GPS) module 916, and/or a power supply 918.

The cellular baseband processor 904 communicates through the cellular RF transceiver 922 with the UE 104 and/or network device 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 3, the cellular baseband processor 904 may be a component of the UE 350 and may include the memory 360 and/or at least one of the TX processor 368, the RX processor 356, and/or the controller/processor 359. In one configuration, the apparatus 902 may be a modem chip and/or may be implemented as the cellular baseband processor 904, while in another configuration, the apparatus 902 may be the entire UE (e.g., the UE 350 of FIG. 3) and may include some or all of the abovementioned components, circuits, chips, and/or other circuitry illustrated in the context of the apparatus 902. In one configuration, the cellular RF transceiver 922 may be implemented as at least one of the transmitter 354TX and/or the receiver 354RX.

The reception component 930 may be configured to receive signaling on a wireless channel, such as signaling from a network device 102/180 or UE 104. The transmission component 934 may be configured to transmit signaling on a wireless channel, such as signaling to a network device 102/180 or UE 104. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission.

The communication manager 932 includes a DCI component 942 that is configured to receive, in an initial slot among a plurality of slots, downlink control information (DCI) scheduling physical downlink shared channel (PDSCH) over the plurality of slots, e.g., as described in connection with operation 702 from FIG. 7. As another example, referring to FIG. 6, the UE 604 may receive DCI scheduling a PDSCH over a plurality of slots 622 from the network device 602.

In some aspects, the communication manager 932 also includes a resource mapping component 944 that is configured to receive a resource mapping configuration associated with the set of A-ZP-CSI-RS resources, e.g., as described in connection with operation 704 from FIG. 7. As another example, referring to FIG. 6, the UE 604 may receive resource mapping configuration associated with the set of A-ZP-CSI-RS resources 628 from the network device 602.

In some aspects, the communication manager 932 further includes a rate matching component 946 that is configured to receive a PDSCH transmission in one of the plurality of slots using a rate matching pattern associated with the set of A-ZP-CSI-RS resources, e.g., as described in connection with operation 706 from FIG. 7. As an example, referring to FIG. 6, the UE 604 may receive a PDSCH transmission in one of the plurality of slots using a rate matching pattern associated with the set of A-ZP-CSI-RS resources 632 from the network device 602. As another example, referring to FIG. 4, the UE 604 may receive a PDSCH in the PDSCH 3 407 using a rate matching pattern associated with the set of A-ZP-CSI-RS resources (e.g., a A-ZP-CSI-RS trigger with offset 3). As yet another example, referring to FIG. 5, the UE 604 may receive a PDSCH transmission in the PDSCH1 503, PDSCH 3 507, and PDSCH 5 511 using a rate matching pattern associated with the set of A-ZP-CSI-RS resources (e.g., a ZP-CSI-RS trigger with offset 1, periodicity 2, and number of repetitions 3).

The apparatus 902 may include additional components that perform some or all of the blocks, operations, signaling, etc. of the algorithm(s) in the aforementioned call flow diagram(s) and/or flowchart(s) of FIGS. 6-7. As such, some or all of the blocks, operations, signaling, etc. in the aforementioned call flow diagram(s) and/or flowchart(s) of FIGS. 6-7 may be performed by one or more components and the apparatus 902 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, may include means for receiving, in an initial slot among a plurality of slots, DCI scheduling a PDSCH over the plurality of slots, wherein the DCI triggers a A-ZP-CSI-RS resources, receiving a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and receiving a PDSCH transmission in one of the plurality of slots using a rate matching pattern associated with the set of A-ZP-CSI-RS resources The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
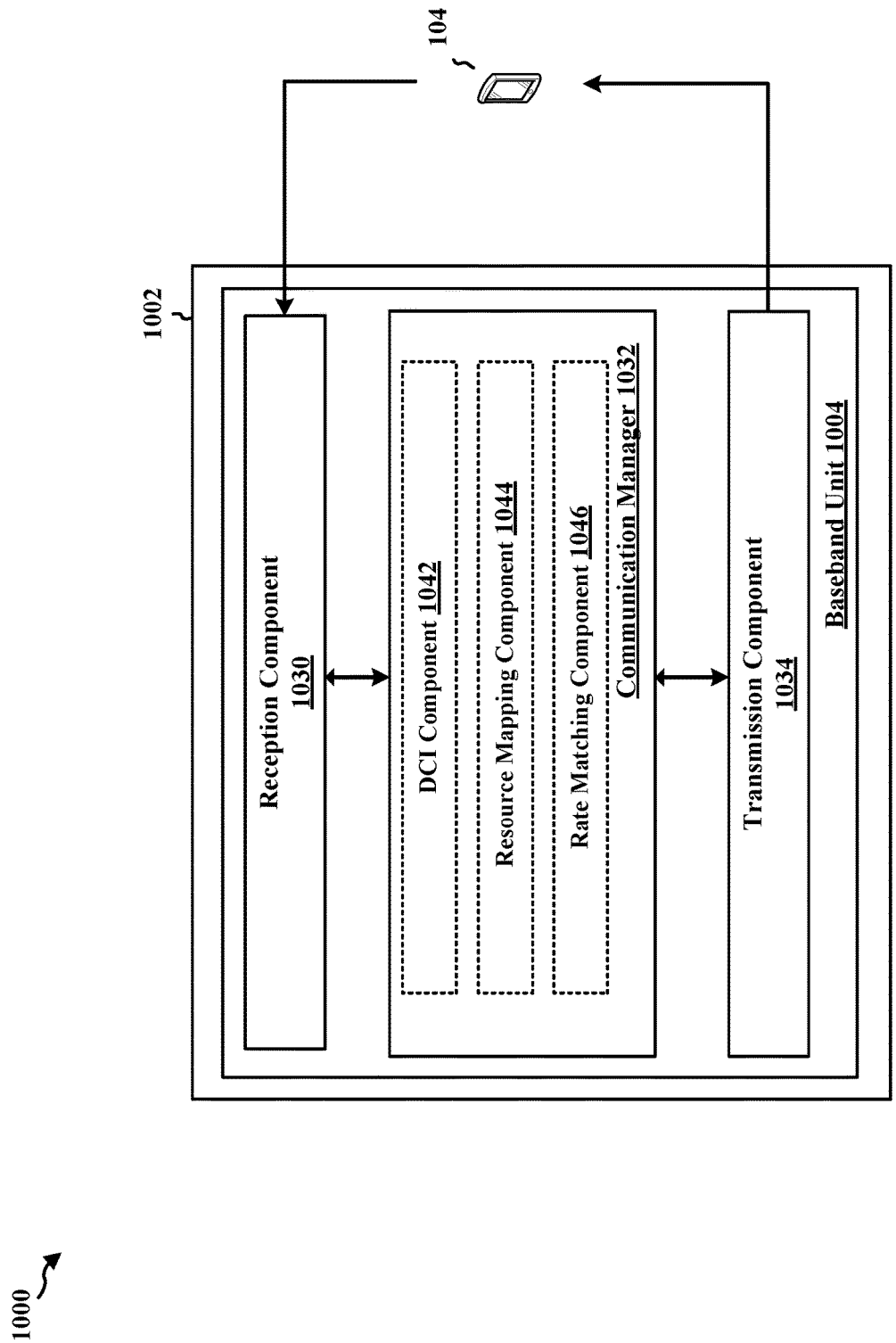
FIG. 10 is a diagram illustrating another example of a hardware implementation for another example apparatus.

FIG. 10 is a diagram 1000 illustrating an example of a hardware implementation for an apparatus 1002. The apparatus 1002 may be a network device or similar device or system, or the apparatus 1002 may be a component of a network device or similar device or system. The apparatus 1002 may include a baseband unit 1004. The baseband unit 1004 may communicate through a cellular RF transceiver. For example, the baseband unit 1004 may communicate through a cellular RF transceiver with a UE 104, such as for downlink and/or uplink communication, and/or with a network device 102/180, such as for IAB.

The baseband unit 1004 may include a computer-readable medium/memory, which may be non-transitory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the network device 310 and may include the memory 376 and/or at least one of the TX processor 316, the RX processor 370, and the controller/processor 375.

The reception component 1030 may be configured to receive signaling on a wireless channel, such as signaling from a UE 104 or network device 102/180. The transmission component 1034 may be configured to transmit signaling on a wireless channel, such as signaling to a UE 104 or network device 102/180. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1032 includes a DCI component 1042 that is configured to transmit, in an initial slot among a plurality of slots, downlink control information (DCI) scheduling a physical downlink shared channel (PDSCH) over the plurality of slots, e.g., as described in connection with operation 802 from FIG. 8. As another example, referring to FIG. 6, the network device 602 may transmit DCI scheduling a PDSCH over a plurality of slots 622 to the UE 604.

In some aspects, the communication manager 932 may include a resource mapping component 1044 that is configured to transmit a resource mapping configuration associated with the set of A-ZP-CSI-RS resources, e.g., as described in connection with operation 804 from FIG. 8. As another example, referring to FIG. 6, the network device 602 may transmit resource mapping configuration associated with the set of A-ZP-CSI-RS resources 628 to the UE 604.

In some aspects, the communication manager 1032 further includes a rate matching component 1046 that is configured to transmit a PDSCH transmission in one of the plurality of slots using a rate matching pattern associated with the set of A-ZP-CSI-RS resources, e.g., as described in connection with operation 806 from FIG. 8. As an example, referring to FIG. 6, the network device 602 may transmit a PDSCH transmission in one of the plurality of slots using a rate matching pattern associated with the set of A-ZP-CSI-RS resources 632 to the UE 604. As another example, referring to FIG. 4, the network device 602 may transmit a PDSCH transmission in the PDSCH 3 407 using a rate matching pattern associated with the set of A-ZP-CSI-RS resources (e.g., a A-ZP-CSI-RS trigger with offset 3). As yet another example, referring to FIG. 5, the network device 602 may transmit a PDSCH transmission in the PDSCH1 503, PDSCH 3 507, and PDSCH 5 511 using a rate matching pattern associated with the set of A-ZP-CSI-RS resources (e.g., a ZP-CSI-RS trigger with offset 1, periodicity 2, and number of repetitions 3).

The apparatus 1002 may include additional components that perform some or all of the blocks, operations, signaling, etc. of the algorithm(s) in the aforementioned call flow diagram(s) and/or flowchart(s) of FIGS. 6 and 8. As such, some or all of the blocks, operations, signaling, etc. in the aforementioned call flow diagram(s) and/or flowchart(s) of FIGS. 6 and 8 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, may include means for: transmitting, in an initial slot among a plurality of slots, downlink control information (DCI) scheduling physical downlink shared channel (PDSCH) over the plurality of slots, wherein the DCI triggers a set of aperiodic zero power channel state information reference signal (A-ZP-CSI-RS) resources; transmitting a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and transmitting a PDSCH transmission in one of the plurality of slots using a rate matching pattern associated with the set of A-ZP-CSI-RS resources.

The aforementioned means may be one or more of the aforementioned components of the apparatus 1002 configured to perform the functions recited by the aforementioned means. As described supra, the apparatus 1002 may include the TX Processor 416, the RX Processor 470, and the controller/processor 375. As such, in one configuration, the aforementioned means may be the TX Processor 416, the RX Processor 470, and the controller/processor 375 configured to perform the functions recited by the aforementioned means.

Aspects of the present disclosure allow for more efficient rate matching by allowing a triggered A-ZP-CSI-RS set to support rate matching around multiple slots. Aspects of the present disclosure may allow a triggered A-ZP CSI-RS set to be applied to less than all scheduled PDSCH slots when DCI schedules PDSCH on multiple slots. Aspects of the present disclosure may extend CSI-RS resource mapping to span multiple adjacent slots. In another instance, aspects of the present disclosure allow a resource mapping configuration to indicate an initial symbol of a plurality of symbols spanning the plurality of slots for a respective A-ZP-CSI-RS resource. Doing so also allows a PDSCH transmission in one of the plurality of slots using a rate matching pattern associated with a set of A-ZP-CSI-RE resources to be received. In addition, aspects of the present disclosure can also add periodicity to A-ZP-CSI-RS resource set configuration.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

Some Additional Examples

The following examples are illustrative only and may be combined with aspects of other embodiments or teachings described herein, without limitation.

Aspect 1. An apparatus for wireless communication at a user equipment (UE), comprising:
a memory; and
at least one processor coupled to the memory and configured to:
receive, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
receive a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and
receive a PDSCH transmission in a slot of the plurality of slots using a rate matching pattern associated with the set of A-ZP-CSI-RS resources, wherein the rate matching pattern is based at least in part on the resource mapping configuration.

Aspect 2. The apparatus of aspect 1, wherein the DCI indicates a slot offset value, wherein the slot of the plurality of slots is based on the slot offset value.

Aspect 3. The apparatus of aspect 1 or 2, wherein the resource mapping configuration indicates a slot periodicity, wherein the rate matching pattern is based on the slot periodicity with respect to the slot offset value and a number of slot repetitions.

Aspect 4. The apparatus of any of the aspects 1 to 3, wherein the slot periodicity is configured from the set of A-ZP-CSI-RS resources.

Aspect 5. The apparatus of any of the aspects 1 to 4, wherein the DCI indicates the number of slot repetitions.

Aspect 6. The apparatus of any of the aspects 1 to 5, wherein the number of slot repetitions is based on a DCI indication and a radio resource control (RRC) configuration.

Aspect 7. The apparatus of any of the aspects 1 to 6, wherein the slot offset value is based on a DCI indication and the number of RRC-configured candidate values.

Aspect 8. The apparatus of any of the aspects 1 to 7, wherein the slot offset value is based on a DCI indication and a RRC configuration.

Aspect 9. The apparatus of any of the aspects 1 to 8, wherein the slot offset value is indicated by a length of field in the DCI according to a number of RRC-configured candidate values.

Aspect 10. A method for wireless communication by a user equipment (UE), comprising:
receiving, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
receiving a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and
receiving a PDSCH transmission in a slot of the plurality of slots using a rate matching pattern associated with the set of A-ZP-CSI-RS resources, wherein the rate matching pattern is based at least in part on the resource mapping configuration.

Aspect 11. The method of aspect 10, wherein the DCI indicates a slot offset value, wherein the slot of the plurality of slots is based on the slot offset value.

Aspect 12. The method of aspects 10 or 11, wherein the resource mapping configuration indicates a slot periodicity, wherein the rate matching pattern is based on the slot periodicity with respect to the slot offset value and a number of slot repetitions.

Aspect 13. The method of any of the aspects 10 to 12, wherein the slot periodicity is configured from the set of A-ZP-CSI-RS resources.

Aspect 14. The method of any of the aspects 10 to 13, wherein the DCI indicates the number of slot repetitions.

Aspect 15. The method of any of the aspects 10 to 14, wherein the number of slot repetitions is based on a DCI indication and a radio resource control (RRC) configuration.

Aspect 16. The method of any of the aspects 10 to 15, wherein the number of slot repetitions is indicated by a length of a field in the DCI according to a number of RRC-configured candidate values.

Aspect 17. The method of any of the aspects 10 to 16, wherein the slot offset value is based on a DCI indication and a RRC configuration.

Aspect 18. The method of any of the aspects 10 to 17, wherein the slot offset value is indicated by a length of a field of the DCI according to a number of RRC-configured candidate values.

Aspect 19. An apparatus for wireless communication at a network device, comprising:
a memory; and
at least one processor coupled to the memory and configured to:
transmit, in an initial slot among a plurality of slots, downlink control information (DCI) scheduling physical downlink shared channel (PDSCH) over the plurality of slots, wherein the DCI triggers a set of aperiodic zero power channel state information reference signal (A-ZP-CSI-RS) resources;
transmit a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and
transmit a PDSCH transmission in a slot of the plurality of slots using a rate matching pattern associated with the set of A-ZP-CSI-RS resources, wherein the rate matching pattern is based at least in part on the resource mapping configuration.

Aspect 20. The apparatus of aspect 19, wherein the DCI indicates a slot offset value, wherein the slot of the plurality of slots is based on the slot offset value.

Aspect 21. The apparatus of aspects 19 or 20, wherein the resource mapping configuration indicates a slot periodicity, wherein the rate matching pattern is based on the slot periodicity with respect to the slot offset value and a number of slot repetitions.

Aspect 22. The apparatus of any of the aspects 19 to 21, wherein the slot periodicity is configured from the set of A-ZP-CSI-RS resources.

Aspect 23. The apparatus of any of the aspects 19 to 22, wherein the DCI indicates the number of slot repetitions.

Aspect 24. The apparatus of any of the aspects 19 to 23, wherein the number of slot repetitions is based on a DCI indication and a radio resource control (RRC) configuration.

Aspect 25. The apparatus of any of the aspects 19 to 24, wherein the number of slot repetitions is indicated by a length of a field in the DCI indication according to a number of a RRC-configured candidate values.

Aspect 26. The apparatus of any of the aspects 19 to 25, wherein the slot offset value is based on a DCI indication and a RRC configuration.

Aspect 27. The apparatus of any of the aspects 19 to 26, wherein the slot offset value is indicated by a length of field in the DCI according to a number of RRC-configured candidate values.

Aspect 28. A method for wireless communication by a network device, comprising:
transmitting, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
transmitting a resource mapping configuration associated with the set of A-ZP-CSI-RS resources, wherein the resource mapping configuration indicates an initial symbol of a plurality of symbols spanning the plurality of slots for a respective A-ZP-CSI-RS resource in the set of A-ZP-CSI-RS resources; and
transmitting a PDSCH transmission in a slot of the plurality of slots using a rate matching pattern associated with the set of A-ZP-CSI-RS resources, wherein the rate matching pattern is based at least in part on the resource mapping configuration.

Aspect 29. The method of aspect 28, wherein the DCI indicates a slot offset value, wherein the slot of the plurality of slots in which the PDSCH transmission is received using the rate matching pattern is based on the slot offset value.

Aspect 30. The method of aspects 28 or 29, wherein the resource mapping configuration indicates a slot periodicity, wherein the rate matching pattern is based on the slot periodicity with respect to the slot offset value and a number of slot repetitions.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a user equipment (UE), comprising:
   a memory; and
   at least one processor coupled to the memory and configured to:
   receive, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
   receive a resource mapping configuration associated with the set of A-ZP-CSI-RS resources, wherein the resource mapping configuration indicates a slot periodicity and an initial symbol of a plurality of symbols spanning the plurality of slots for a respective A-ZP-CSI-RS resource in the set of A-ZP-CSI-RS resources; and
   receive a PDSCH transmission in a slot of the plurality of slots using a rate matching pattern associated with the set of A-ZP-CSI-RS resources, wherein the rate matching pattern is based at least in part on the resource mapping configuration and the slot periodicity with respect to a slot offset value and a number of slot repetitions.

2. The apparatus of claim 1, wherein the DCI indicates a slot offset value, wherein the slot of the plurality of slots is based on the slot offset value.

3. The apparatus of claim 1, wherein the slot periodicity is configured from the set of A-ZP-CSI-RS resources.

4. The apparatus of claim 1, wherein the DCI indicates the number of slot repetitions.

5. The apparatus of claim 4, wherein the number of slot repetitions is based on a DCI indication and a radio resource control (RRC) configuration.

6. The apparatus of claim 5, wherein the number of slot repetitions is indicated by a length of a field in the DCI according to a number of a RRC-configured candidate values.

7. The apparatus of claim 2, wherein the slot offset value is based on a DCI indication and a RRC configuration.

8. The apparatus of claim 7, wherein the slot offset value is indicated by a length of field in the DCI according to a number of RRC-configured candidate values.

9. A method for wireless communication by a user equipment (UE), comprising:
   receiving, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
   receiving a resource mapping configuration associated with the set of A-ZP-CSI-RS resources, wherein the resource mapping configuration indicates a slot periodicity and an initial symbol of a plurality of symbols spanning the plurality of slots for a respective A-ZP-CSI-RS resource in the set of A-ZP-CSI-RS resources; and
   receiving a PDSCH transmission in a slot of the plurality of slots using a rate matching pattern associated with the set of A-ZP-CSI-RS resources, wherein the rate matching pattern is based at least in part on the resource mapping configuration and the slot periodicity with respect to a slot offset value and a number of slot repetitions.

10. The method of claim 9, wherein the DCI indicates a slot offset value, wherein the slot of the plurality of slots is based on the slot offset value.

11. The method of claim 9, wherein the slot periodicity is configured from the set of A-ZP-CSI-RS resources.

12. The method of claim 9, wherein the DCI indicates the number of slot repetitions.

13. The method of claim 12, wherein the number of slot repetitions is based on a DCI indication and a radio resource control (RRC) configuration.

14. The method of claim 13, wherein the number of slot repetitions is indicated by a length of a field in the DCI according to a number of RRC-configured candidate values.

15. The method of claim 10, wherein the slot offset value is based on a DCI indication and a RRC configuration.

16. The method of claim 15, wherein the slot offset value is indicated by a length of a field of the DCI according to a number of RRC-configured candidate values.

17. An apparatus for wireless communication at a network device, comprising:
a memory; and
at least one processor coupled to the memory and configured to:
transmit, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
transmit a resource mapping configuration associated with the set of A-ZP-CSI-RS resources, wherein the resource mapping configuration indicates a slot periodicity and an initial symbol of a plurality of symbols spanning the plurality of slots for a respective A-ZP-CSI-RS resource in the set of A-ZP-CSI-RS resources; and
transmit a PDSCH transmission in a slot of the plurality of slots using a rate matching pattern associated with the set of A-ZP-CSI-RS resources, wherein the rate matching pattern is based at least in part on the resource mapping configuration and the slot periodicity with respect to a slot offset value and a number of slot repetitions.

18. The apparatus of claim 17, wherein the DCI indicates a slot offset value, wherein the slot of the plurality of slots is based on the slot offset value.

19. The apparatus of claim 17, wherein the slot periodicity is configured from the set of A-ZP-CSI-RS resources.

20. The apparatus of claim 17, wherein the DCI indicates the number of slot repetitions.

21. The apparatus of claim 20, wherein the number of slot repetitions is based on a DCI indication and a radio resource control (RRC) configuration.

22. The apparatus of claim 21, wherein the number of slot repetitions is indicated by a length of a field in the DCI indication according to a number of a RRC-configured candidate values.

23. The apparatus of claim 18, wherein the slot offset value is based on a DCI indication and a RRC configuration.

24. The apparatus of claim 23, wherein the slot offset value is indicated by a length of field in the DCI according to a number of RRC-configured candidate values.

25. A method for wireless communication by a network device, comprising:
transmitting, in an initial slot among a plurality of slots, downlink control information (DCI) scheduling a physical downlink shared channel (PDSCH) over the plurality of slots, wherein the DCI triggers a set of aperiodic zero power channel state information reference signal (A-ZP-CSI-RS) resources;
transmitting a resource mapping configuration associated with the set of A-ZP-CSI-RS resources, wherein the resource mapping configuration indicates a slot periodicity and an initial symbol of a plurality of symbols spanning the plurality of slots for a respective A-ZP-CSI-RS resource in the set of A-ZP-CSI-RS resources; and
transmitting a PDSCH transmission in a slot of the plurality of slots using a rate matching pattern associated with the set of A-ZP-CSI-RS resources, wherein the rate matching pattern is based at least in part on the resource mapping configuration and the slot periodicity with respect to a slot offset value and a number of slot repetitions.

26. The method of claim 25, wherein the DCI indicates a slot offset value, wherein the slot of the plurality of slots in which the PDSCH transmission is received using the rate matching pattern is based on the slot offset value.

* * * * *